United States Patent [19]

Robertson

[11] 4,407,088

[45] Oct. 4, 1983

[54] METHOD AND APPARATUS FOR SUPPLYING TRAWL

[76] Inventor: Thomas A. Robertson, Sheldrake Lake, R.R. No. 3, Armdale, Halifax County, Nova Scotia, Canada, B3L 4J3

[21] Appl. No.: 279,823

[22] Filed: Jul. 2, 1981

[51] Int. Cl.³ ............................................. A01K 79/00
[52] U.S. Cl. ...................................... 43/4.5; 43/27.4; 43/57.3
[58] Field of Search ...................... 43/4, 4.5, 6.5, 27.4, 43/57.3

[56] References Cited

U.S. PATENT DOCUMENTS

| Re. 28,380 | 4/1975 | Tison | 43/6.5 |
| 4,354,323 | 10/1982 | Huff | 43/4 |

FOREIGN PATENT DOCUMENTS

| 102350 | 8/1963 | Norway | 43/6.5 |
| 218561 | 9/1968 | U.S.S.R. | 43/27.4 |
| 296541 | 4/1971 | U.S.S.R. | 43/27.4 |

OTHER PUBLICATIONS

*World Fishing*, Sep. 1971, pp. 26–27, "New Hope for Longlining".

Primary Examiner—Nicholas P. Godici
Assistant Examiner—J. Reed Batten, Jr.
Attorney, Agent, or Firm—Bachman and LaPointe

[57] ABSTRACT

An apparatus and method for supply of a trawl comprising a ground line and gangions attached at spaced intervals thereto; in the method a plurality of circumferentially spaced apart hook racks which support the trawl, is advanced along an arcuate path, in a first direction, until a first hook rack arrives at an operative position for supplying the trawl to a baiter; the first rack is held in position and the gangions of the trawl are drawn from the first hook rack, with travel of the ground line of the trawl through a baiter; when the first hook rack is emptied the hook racks are advanced along the arcuate path until a second following hook rack is in the operative position; the racks are pivotally mounted in parallel arrangement, on a frame of circular cross-section, thus as the racks are emptied they are rotated away from the operative position; prolonged interruptions for replacing the heavy hook racks manually as well as the need for secure deck storage space for empty racks in the vicinity of the assembly are thus avoided.

9 Claims, 12 Drawing Figures

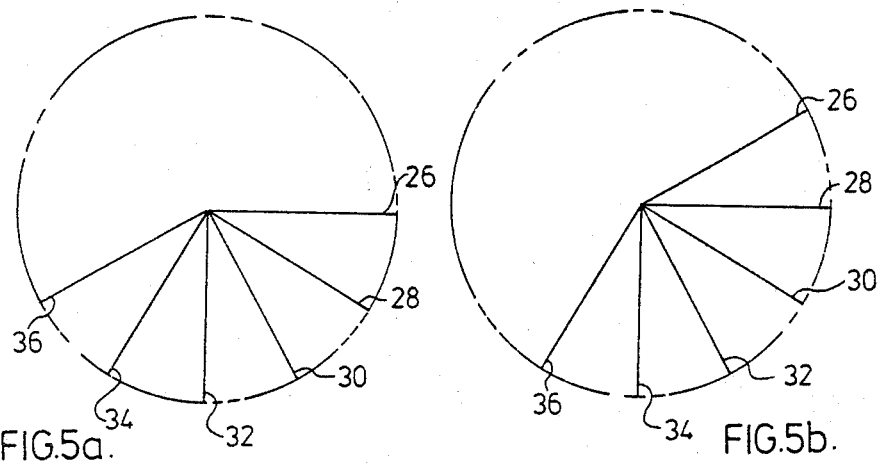
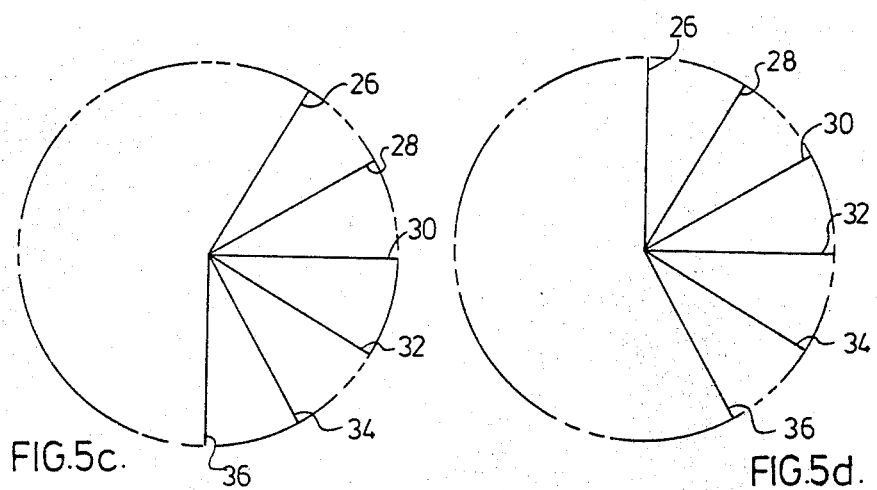
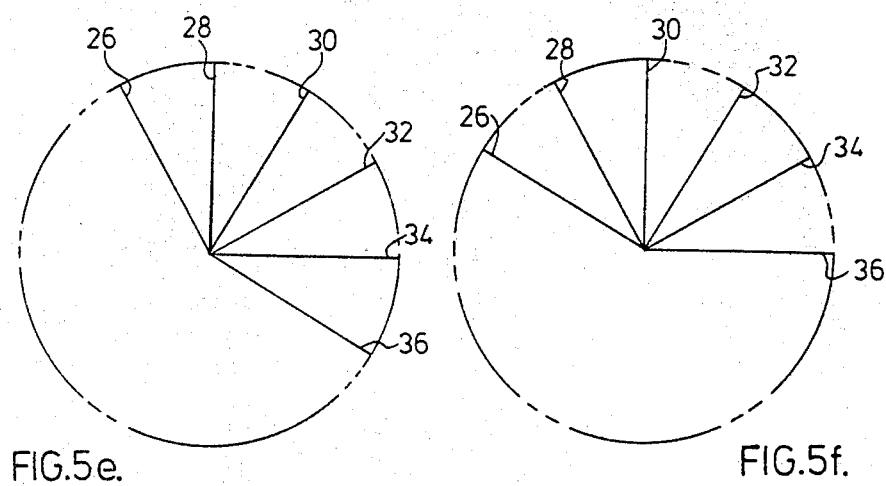
FIG.5a. FIG.5b. FIG.5c. FIG.5d. FIG.5e. FIG.5f.

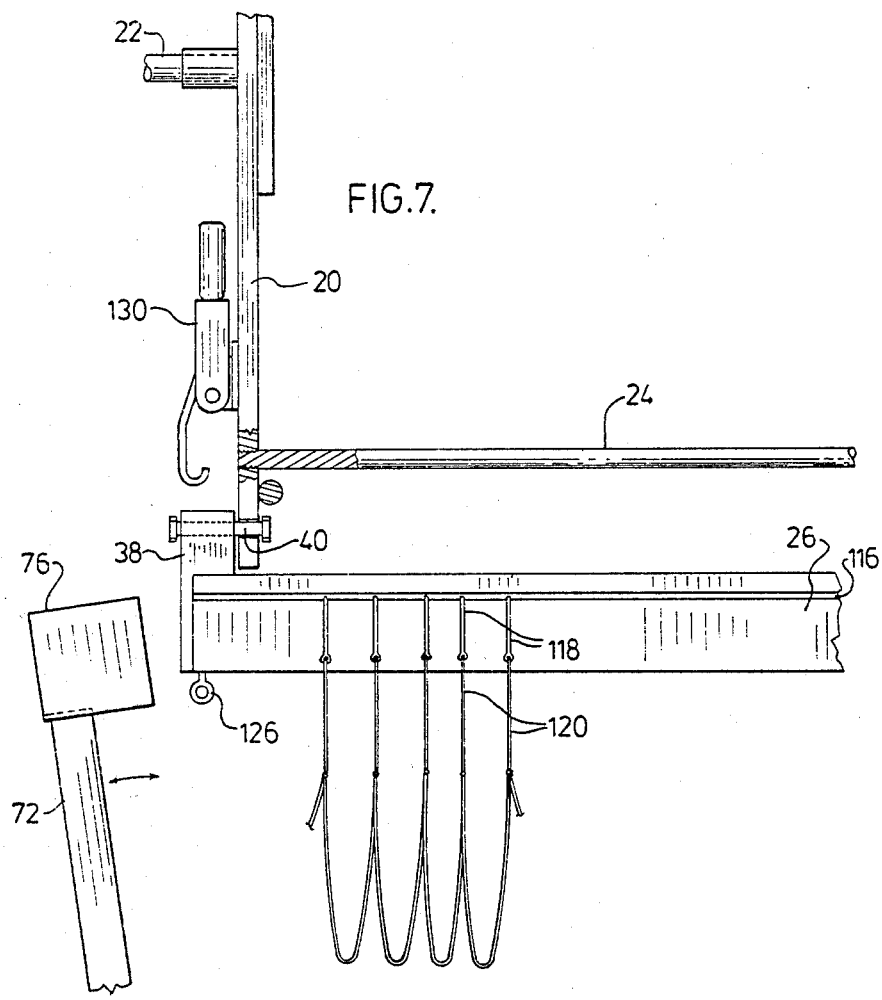
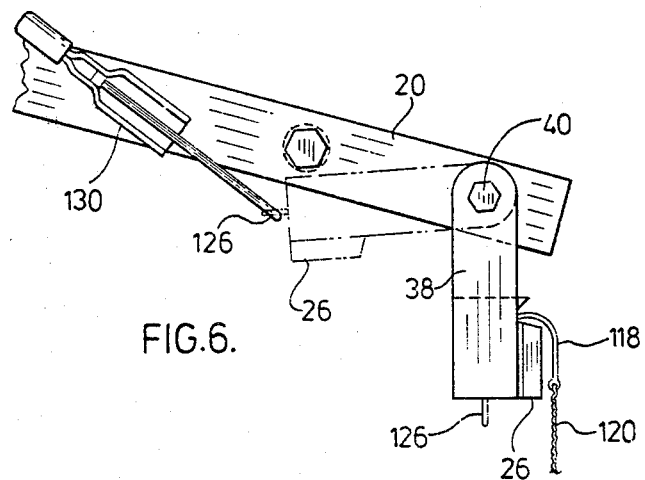

METHOD AND APPARATUS FOR SUPPLYING TRAWL

BACKGROUND OF THE INVENTION (a) Field of the Invention

This invention relates to a method and apparatus for supplying a trawl and particularly for supplying a trawl for travel through a baiter.

(b) Description of Prior Art

In trawling operations a main or ground line is fed into the water through a baiter, as the trawler travels through the water. Individual short lines known as gangions are attached to the ground line at spaced intervals, a fish hook being attached to the free end of each gangion. As the gangions are drawn through the baiter, bait portions are hooked by the hooks.

The ground line with the attached gangions and hooks is known as the trawl.

Existing trawl supplying apparatus employs elongated hook racks in which the gangions hang by their hooks in side by side relationship. Typically a hook rack may be 8 feet long and support 100 hooks per foot. The gangions are suitably attached to the ground line at spaced apart intervals of about 42 inches, however, the spaced intervals may be varied according to the preference of individual fishermen.

A hook rack is moved to an appropriate position relative to the baiter, and the trawl is drawn from the hook rack and through the baiter, when the hook rack is empty it is removed and is replaced by a fresh hook rack to continue the supply of the trawl. The ground line is usually formed in predetermined lengths of about 1,400 feet and so after two hook racks have been used it is necessary to attach the trailing end of the ground line from the second hook rack to the leading end of the ground line in the third hook rack. Most trawlers employ manual replacement of hook racks, although automatic assemblies have been developed which are employed by some larger trawlers.

When the trawling operation is completed the steps are reversed to fill the racks with the trawl, for subsequent use, but, of course, the trawl need not pass through the baiter when being withdrawn from the water.

The conventional system employing manual replacement of the hook racks has the particular disadvantage that the supply of trawl is necessarily interrupted each time that a hook rack is emptied, while the empty rack is removed and a fresh hook rack is brought into place. In addition storage space is required on the deck to securely store the empty racks in the vicinity of the trawl supplying assembly.

The automatic trawl supplying assemblies, on the other hand, are costly, and only economic for large trawlers.

It is an object of the invention to provide an apparatus for the continual supply of a trawl, without interruptions.

It is a further object of the invention to provide an apparatus for the supply of a trawl which is of relatively simple construction.

It is a further object of the invention to provide an apparatus for the supply of a trawl which does not require time consuming manual operations for replacing empty hook racks by filled hook racks.

It is still a further object of the invention to provide an apparatus for the supply of a trawl which does not require deck storage space to be maintained in the vicinity of the apparatus, for empty hook racks.

It is yet another object of this invention to provide a method for supplying a trawl through a baiter, which employs equipment of relatively simple construction and yet does not necessitate interruptions for replacement of empty hook racks with filled hook racks.

SUMMARY OF THE INVENTION

According to one aspect of the invention there is provided an apparatus for supplying a trawl comprising: a supporting frame, a hook rack assembly including a plurality of pivotally mounted hook racks circumferentially spaced apart in parallel arrangement, said hook rack assembly being rotatably mounted in said supporting frame for rotary advancement of each hook rack to an operative position for supplying trawl, and means to hold said assembly against rotation when a hook rack is in said operative trawl supplying position.

Suitably the hook racks are aligned so that the ends of adjacent racks are in opposed relationship.

It is also appropriate to include in the apparatus a retaining means to prevent pivotal swinging movement of the filled hook racks, when one of the hook racks is in the operative trawl supplying position and to include clamping means to clamp the emptied hook racks against pivotal swinging movement. If the hook racks are permitted to swing freely in the assembly then their swinging movement may cause damage or present a hazard to fishermen, particularly in rough seas.

In another aspect of the invention there is provided a method for supplyling a trawl supported by hook racks through a baiter comprising: advancing a plurality of circumferentially spaced apart hook racks supporting said trawl along an arcuate path in a first direction, until a first hook rack arrives at an operative position for supplying trawl, holding said first rack in said operative position, drawing a plurality of gangions of said trawl, from said first hook rack, with travel of the ground line of said trawl through a baiter, until said first hook rack is empty, and advancing the hook racks along said arcuate path in said first direction until a second hook rack is in said operative position.

In the operation of the method of the invention the hook racks are successively fed along the arcuate path to the operative trawl supplying position until all the hook racks have been emptied. When the trawl is withdrawn from the water the hook racks are filled in succession, the last emptied hook rack being filled first. As the hook racks are filled they are advanced along the arcuate path in a second direction counterwise to the first direction until a following empty hook rack is in the operative position.

BRIEF DESCRIPTION OF THE DRAWINGS

A particular and preferred embodiment of the invention is illustrated in the accompanying drawings in which:

FIGS. 5a, 5b, 5c, 5d, 5e and 5f illustrate schematically the advancement of the hook racks in the method of the invention;

FIG. 6 shows in detail a hook rack in free swinging and clamped positions;

FIG. 7 is a detail showing how a hook rack is held secure.

DESCRIPTION OF THE PREFERRED EMBODIMENTS WITH REFERENCE TO THE DRAWINGS

Figure 1:
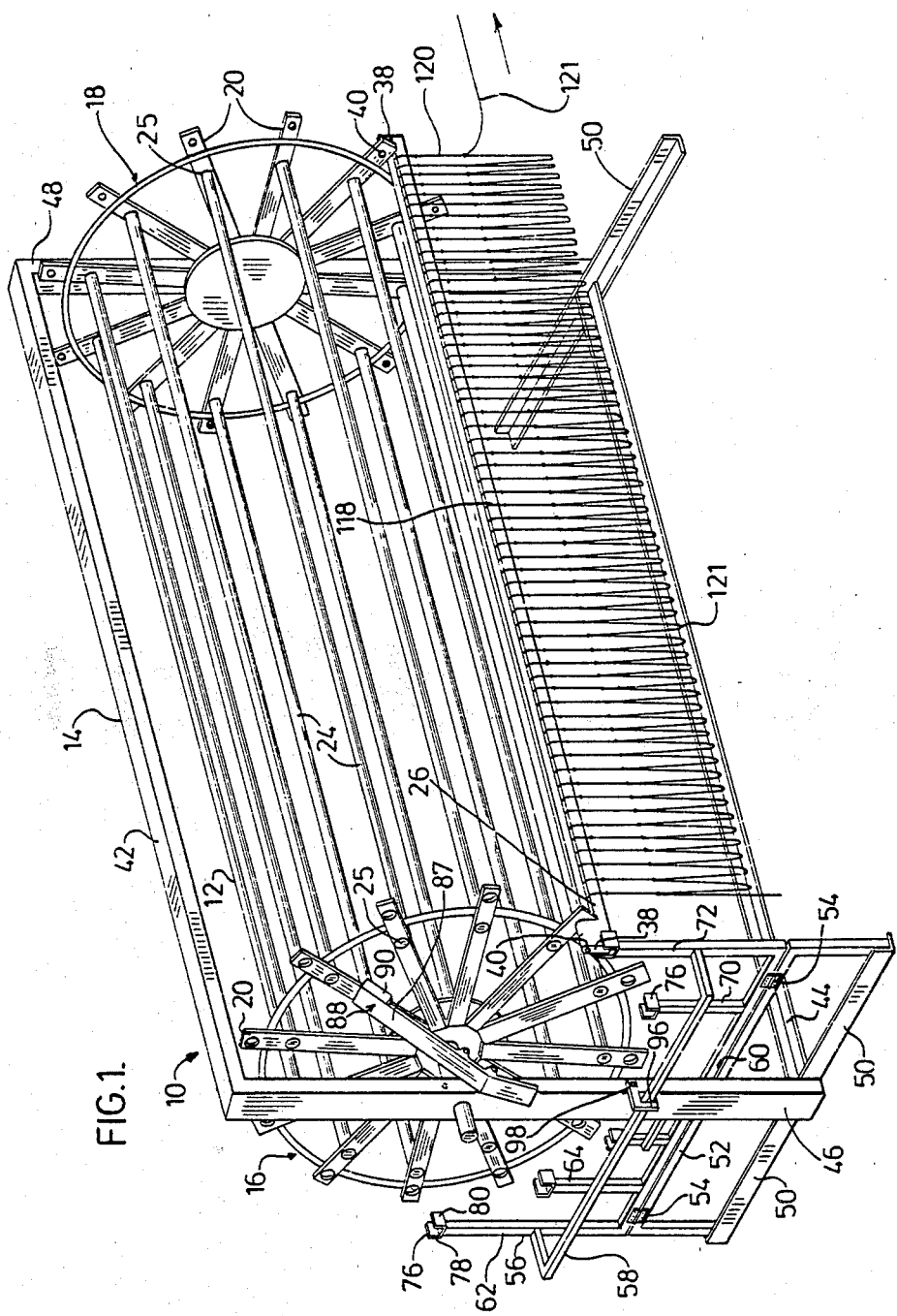
FIG. 1 is a perspective view of a trawl supplying apparatus of the invention.
Figure 2:
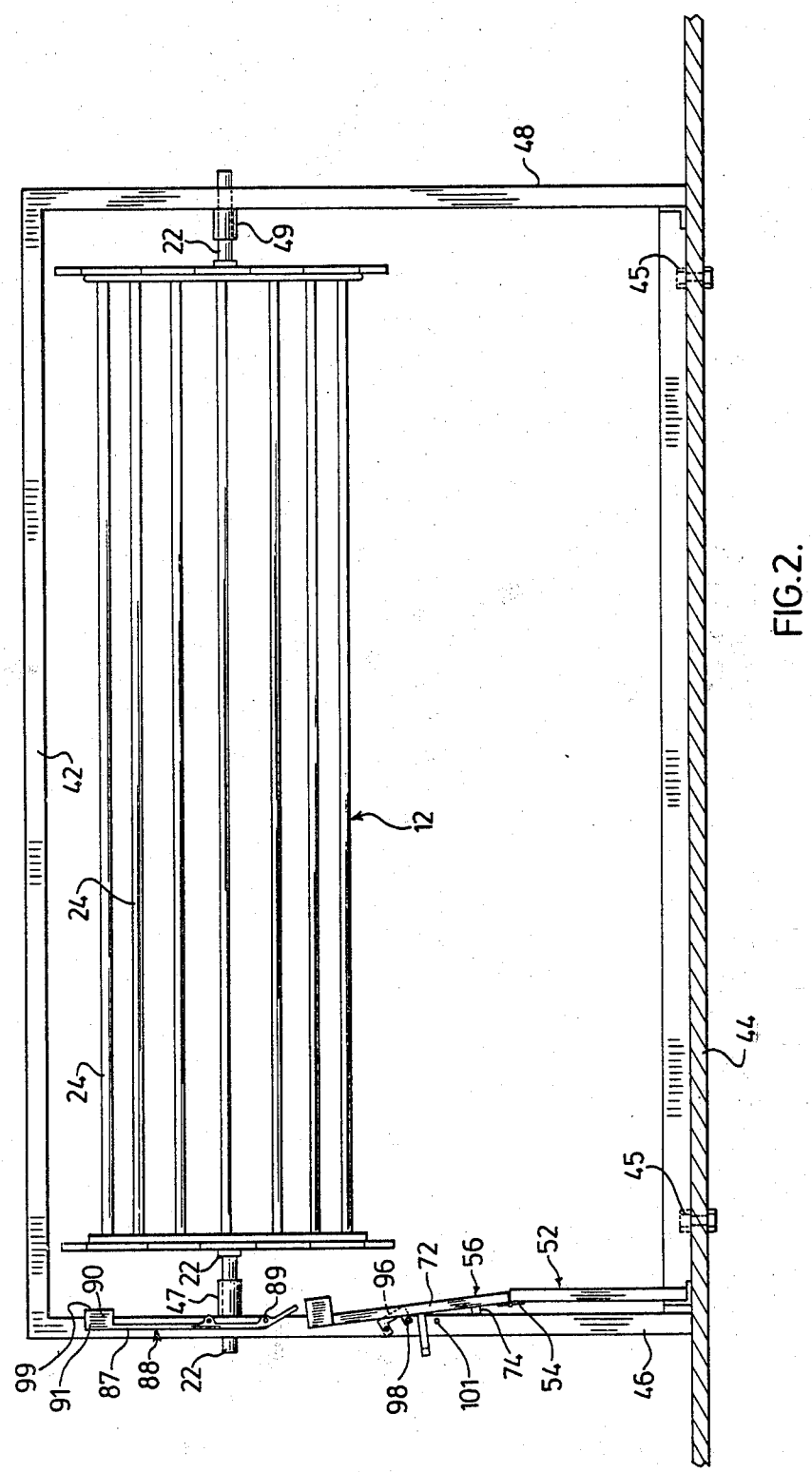
FIG. 2 is a side view of the apparatus of FIG. 1.
Figure 3:
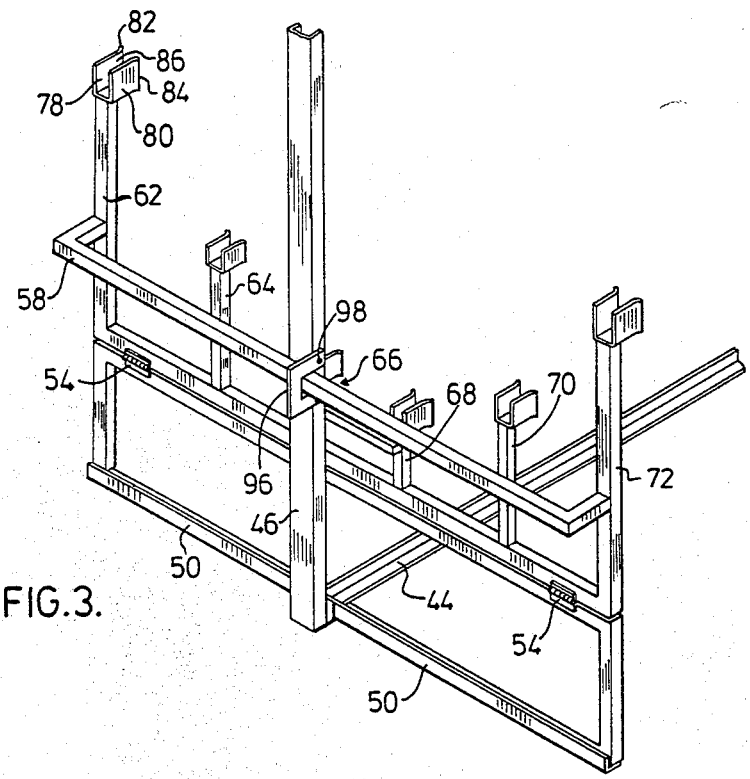
FIG. 3 is a perspective view of a retaining frame forming a part of the supporting frame.

With further reference to FIGS. 1, 2 and 3, an apparatus of the invention for supplying trawl comprises a reel assembly 10 including a reel 12 and a supporting frame 14.

Reel 12 includes a pair of wheel members 16 and 18, each having a plurality of spoke members 20 and a centrally disposed hub shaft 22. Rods 24 extend between opposed spoke members 20 of wheel members 16 and 18, and threadedly engage opposed holes 25 in the spoke members 20.

Pivotally mounted on reel 12 is a plurality of hook racks 26, 28, 30, 32, 34 and 36, (only rack 26 is shown in FIG. 1, all the racks are shown schematically in FIGS. 5a to 5f) each of the hook racks being mounted on a pair of opposed spoke members 20 of wheel members 16 and 18 by arms 36 about pivots 40.

A plurality of gangions 120 hang from the hook racks 26, 28, 30, 32, 34 and 36 (only rack 26 being shown in FIG. 1), by hooks 118, the gangions being connected to a continuous ground line 121 at spaced intervals.

Supporting frame 14 includes a top bar 42 and a bottom bar 44 connected by opposed legs 46 and 48 having shaft mounting members 47 and 49 for shafts 22, and feet 50 extending on either side of legs 46 and 48. Bottom bar 44 suitably includes means, for example bolts 45, to secure the supporting frame 14 to the deck of the trawler.

A hinge frame 52 is mounted on feet 50 and leg 46. A retaining frame 56 is hingedly mounted on hinge frame 52 by a pair of spaced apart hinges 54.

Retaining frame 56 includes an upper bar 58 and a lower bar 60 to which hinges 54 are attached. Lower bar 60 is disposed on an inner side of leg 46 facing reel 12 and upper bar 58 is located on an outer side of leg 46.

Retainer legs 62, 64, 66, 68, 70 and 72 are mounted on bars 58 and 60. A stop bar 74 extends between retainer legs 66 and 68.

U-shaped retainers 76 are mounted on an upper end of each of retainer legs 62, 64, 66, 68, 70 and 72. The retainers 76 comprise opposed side walls 78 and 80 which have outwardly flared ends 82 and 84 respectively. The side walls 78 and 80 define slots 86. Each slot 86 is adapted to receive one of the hook racks, and restrain it against pivotal movement.

A retainer lock 88 is pivotally mounted about a pivot 89 on leg 46 and includes a U-shaped retainer 90 having opposed side walls 91 with outwardly flared ends, mounted on a locking arm 87. The side walls 91 define a slot 99 adapted to receive a spoke member 20 and restrain the reel 12 against rotation.

A locking device 96 is pivotally mounted about a pivot 98 on leg 46 and includes a locking pin adapted to engage a hole in locking device 96 and a hole in leg 46.

A clamp 130 (FIG. 7) is employed to clamp each of the emptied hook racks which have been advanced beyond the operative trawl supplying position.

Figure 4:
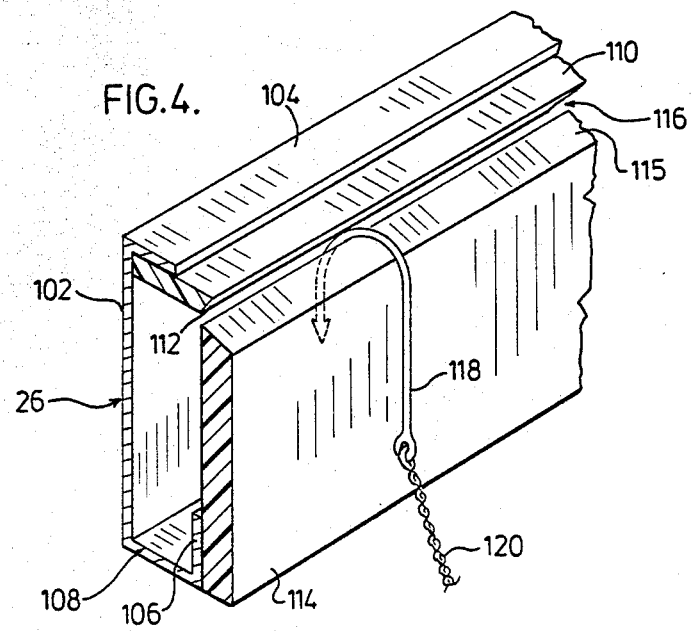
FIG. 4 is a perspective view of a hook rack forming a part of the assembly of the invention.

With further reference to FIG. 4 there is shown a part of a hook rack 26 having a gangion 120 hanging therefrom by a hook 118, the gangion being connected to a ground line 121 (shown in FIGS. 1 and 7).

Hook rack 26 includes a rear wall 102, a top wall 104, a front support wall 106 and a bottom wall 108.

A roof plate 110 having an inclined front surface 112 is mounted under top wall 104 and a front plate 114 having an inclined top surface 115 is mounted in front of front support wall 106. A slot 116 is defined between the inclined surfaces 112 and 115. The hook 118 passes over top surface 115 through slot 116.

As shown in FIGS. 1, 6 and 7, hook rack 26 is pivotally mounted between opposed spoke members 20 of wheel members 16 and 18 by opposed arms 38. The arms 38 on wheel member 16 include an eye member 126 for attachment to clamp 130.

With further reference to FIGS. 5a, 5b, 5c, 5d, 5e and 5f, there is shown schematically the advancement of the hook racks along the arcuate path to bring each of the hook racks into the operative trawl supplying position.

With further reference to FIG. 6 there is illustrated hook rack 26 having gangions 120 hanging therefrom by hooks 118 in the operative position, and in broken line the emptied rack secured against pivotal movement by clamp 130 engaging eye member 126 on arm 38.

With further reference to FIG. 7 there is illustrated schematically the pivotal movement of retainer leg 72 for engagement of hook rack 26 by retainer 76.

In the operation, in accordance with the invention, a baiter is disposed at one end of reel assembly 10 remote from retaining frame 56 so as to receive trawls from a hook rack located in the operative trawl supplying position, which is the position occupied by hook rack 26 in FIG. 5a.

The retaining frame 56 is moved to a non-retaining position in which it is hingedly moved away from reel 12 about hinges 54 with stop bar 74 engaging leg 46. Reel 12 is rotated in counterclockwise direction until hook rack 26 is in the operative position as illustrated in FIG. 5a. Retaining frame 56 is then moved about hinges 54 to a retaining position in which the filled hook racks are received within the slots 86 of retainers 76, hook rack 26 being received within the retainer 76 on retainer leg 72, and hook racks 28, 30, 32, 34 and 36 being received within the retainers 76 on retainer legs 70, 68, 66, 64 and 62 respectively.

Retainer lock 88 is pivoted about pivot 89 until the side walls 91 of retainer 90 engage a spoke member 20, the spoke member 20 being received within slot 99.

In this position the hook racks are restrained against pivotal swinging movement by the side walls 78 and 80 of the retainers 76; in addition retainer 99 of retainer lock 88 restrains the reel 12 against rotary movement.

Locking device 96 is pivoted about pivot 98 to engage top bar 58 and is secured by locking pin 101 to hold retaining frame 56 in the retaining position.

In this position the ground line 121 is drawn through the baiter (not shown) to draw the gangions 120 successively from hook rack 26 through the baiter in which the hooks 118 hook bait and then pass with the bait into the water, with the further travel of ground line 121.

When hook rack 26 is emptied, retainer lock 88 is pivotally moved away from wheel member 16 to free reel 12 for rotation. Locking pin 101 is removed and locking device 96 is pivoted about pivot 98 to free top bar 58 and the retaining frame 56 is moved about hinges 54 to the non-retaining position with stop bar 74 engaging leg 46. Reel 12 is then advanced in counterclockwise direction to the position shown in FIG. 5b in which hook rack 28 is in the operative position. The retaining frame 56 is then returned to the retaining position and secured in place with locking device 96 as previously described, reel 12 is locked by retainer lock 88 to prevent rotary movement, and the emptied hook rack 26 is clamped with clamp 130 to prevent swinging movement thereof (as shown in FIG. 6). In this position hook racks 28, 30, 32, 34 and 36 are, of course, locked by retainers 76.

The operation is continued with successive emptying of the hook racks until hook rack 36 has been emptied. Each emptied hook rack being clamped to prevent pivotal swinging movement by a clamp 130.

When the trawl is withdrawn from the water the reverse operation is carried out, the hook racks being successively advanced in a clockwise direction to the operative position and filled. Thus hook rack 36 is filled first and hook rack 26 is the last to be filled.

Conveniently the ground line 121 may be formed in sections, one section providing the trawl for two adjacent hook racks. Thus in use the trailing edge of the ground line 121 in hook rack 28 would be tied to the leading edge of the ground line 121 of hook rack 30 at a convenient point during the operation, which suitably will be when hook rack 28 is in the operative position.

By means of the method and apparatus of the invention, the supply of trawl to the baiter can be carried out essentially without interruption since the movement of the retaining frame 56 from the retaining position to the non-retaining position, the rotary advacement of reel 12, and the subsequent movement of retainer frame 56 back to the retaining position can be carried out quickly by an operator within the time in which the final gangion of one hook rack is drawn from the hook rack and a pull is felt by the leading gangion of the next hook rack. Additionally there may suitably be provided a length of ground line 121 between the last gangion of one hook rack and the first gangion of a following hook rack to allow more time for advancement of the following hook rack to the operative position.

It will be understood that the component parts of the apparatus must be spatially arranged to achieve their function. For example the spatial arrangement of the retainers 76 on retainer legs 62, 64, 66, 68, 70 and 72, must be such that the retainers 76 will engage an opposed hook rack when one hook rack is in the operative position.

Similarly the retainer lock 88 must be mounted so that it will engage an opposed spoke member 20 when a hook rack is in the operative position.

It will be understood that variations in the mechanical structure of the apparatus may be made without departing from the spirit of the invention. For example various means of locking the reel 12 against rotary movement could be employed instead of retainer lock 88. In particular retainer 76 on retainer leg 72, which engages a hook rack in the operative position, could include upper and lower walls with outwardly flared ends such that the hook rack in the operative position would be engaged by the upper and lower walls as well as the side walls. In such a case the side walls would restrain the hook rack against pivotal movement and the upper and lower walls would effectively restrain the reel against rotary movement.

The apparatus and method of the invention avoids the necessity for operators to lift, remove and securely store emptied hook racks, and to lift into place a filled hook rack. The empty hook racks typically weigh about 15 lbs and are about 8 ft. in length. In addition the apparatus of the invention is much more compact and less costly than the so-called automatic systems available, which necessitate auxilliary equipment for various purposes.

The method and apparatus of the invention can conveniently be operated by a single operator who is not required to do any heavy lifting or storing operations which can be especially hazardous in rough weather.

I claim:

1. Apparatus for supplying a trawl comprising:
    a supporting frame,
    a hook rack assembly including a plurality of pivotally mounted hook racks circumferentially spaced apart in parallel arrangement, said hook rack assembly being rotatably mounted in said supporting frame for rotary advancement of each hook rack to an operative position for supplying trawl, and
    means to hold said assembly against rotation when a hook rack is in said operative trawl supplying position.

2. Apparatus according to claim 1, including retaining means to prevent pivotal movement of filled hook racks when one of the hook racks is in said operative position.

3. Apparatus according to claim 2, including clamping means to clamp empty hook racks, which have been advanced from said operative position, to prevent pivotal movement thereof.

4. Apparatus according to claim 2, wherein said retaining means comprises a retaining frame hingedly mounted to said supporting frame, a plurality of U-shaped retainers mounted in said retaining frame, said retaining frame being hingedly pivotable between a non-retaining position and a retaining position in which each filled hook rack is engaged by a retainer when one of said filled hook racks is in said operative position.

5. Apparatus according to claim 4, wherein the means to hold said assembly against rotation, comprises a U-shaped retainer pivotally mounted on said supporting frame adapted to engage said hook rack assembly when a hook rack is in said operative position to restrain said assembly against rotary movement.

6. A method for supplying a trawl supported by hook racks through a baiter comprising:
    advancing a plurality of circumferentially spaced apart hook racks supporting said trawl along an arcuate path in a first direction, until a first hook rack arrives at an operative position for supplying trawl, holding said first rack in said operative position, drawing a plurality of gangions of said trawl, from said first hook rack, with travel of the ground line of said trawl through a baiter, until said first hook rack is empty, and
    advancing the hook racks along said arcuate path in said first direction until a second hook rack is in said operative position.

7. A method according to claim 6, including a step of fastening the trailing end of the ground line of the trawl supported by a hook rack with the leading end of the ground line of the trawl supported by an adjacent following hook rack.

8. A method according to claim 6, including a step of restraining each filled hook rack to prevent pivotal movement thereof, when one of the hook racks is in said operative position.

9. A method according to claim 8, including a step of restraining each emptied hook rack advanced beyond said operative position, against pivotal movement.

* * * * *